United States Patent Office 3,172,854
Patented Mar. 9, 1965

3,172,854
CORROSION INHIBITION PROCESS
Clyde Stephen Scanley, Stamford, and Frederick Herman Siegele, Westport, Conn., assignors to American Cyanamid Company, Stamford, Conn., a corporation of Maine
No Drawing. Original application Nov. 30, 1960, Ser. No. 72,587, now Patent No. 3,093,654, dated June 11, 1963. Divided and this application Apr. 17, 1963, Ser. No. 273,567
6 Claims. (Cl. 252—8.55)

This invention relates to novel imidazolines and to methods for their preparation. More particularly, this invention relates to novel guanidino-imidazolines, their methods of preparation, and to corrosion inhibitor compositions containing said imidazolines.

As is known, the corrosion of oil-producing and collecting equipment has been a serious drawback in the oil industry. Attempts have been made to minimize or reduce corrosion of ferrous metal in varying degrees of success. For instance, where a corrosion inhibitor, such as formaldehyde, alkali metal hydroxides, amines or a nitrogen base, such as 2-alkyl-imidazolines, is employed in areas requiring large quantities of water in relation to the oil obtained, the cost of the corrosion inhibitor becomes prohibitive. The principal reason for this is that large quantities of an inhibitor must be used in order to substantially minimize corrosion. Concentrations of the order of approximately 10 to 400 parts per million of an inhibitor based on the weight of the oil well fluids would be highly desirable. Concentrations of less than 10 parts per million would even be more desirable. Nonetheless, many of the known corrosion inhibitors unfortunately cannot be used successfully at such low levels.

It is, therefore, an object of the present invention to provide novel corrosion inhibitor compounds having properties highly effective in minimizing corrosion of ferrous metal. It is a further object of the invention to provide corrosion inhibitors which are particularly effective in oil-well environments in which large amounts of saline water are present relative to the amount of oil produced. Other objects and advantages will become apparent to those ordinarily skilled in the art from a consideration of the following detailed description.

To this end, guanidino-imidazolines are provided as unique corrosion inhibitors of metal equipment when employed in amounts as low as two and one-half (2½) parts per million. Such guanidino-imidazolines are also found to be highly effective as bacteriostatic agents.

According to the instant invention, the novel guanidino-imidazolines can be characterized by the following formula:

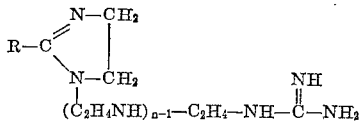

where $n$ is an integer from 1 to 4 and R is an aliphatic radical containing from 4 to 22 carbon atoms such as for instance, butyl, pentyl, hexyl, heptyl, nonyl, undecyl, lauryl, heptadecyl, heptadecenyl and heptadecadienyl. Also provided are mixtures of guanidinoimidazolines derived particularly from tall oil fatty acids. In general, imidazolines having from 1 to 2 C₂H₄NH groups and R ranging from 12 to 18 carbon atoms are preferred embodiments.

The guanidino-imidazoline compounds defined above may be prepared by reacting at least equimolar quantities of cyanamide (NH₂CN) and an imidazoline represented by the structure:

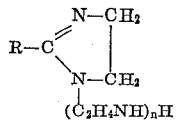

where $n$ is an integer from 1 to 4 and R is the same as defined above. Advantageously, the aforementioned reaction is carried out at elevated temperatures between about 60° C. and 90° C. and at a pH preferably maintained between 7.5 and 11, for from about four to about ten hours, and thereafter recovering the desired guanidino-imidazoline compound.

Among the imidazoline reactants contemplated may be mentioned the following:

2-heptadecyl-1-aminoethylimidazoline,
2-heptadecenyl-1-aminoethylimidazoline,
2-heptadecadienyl-1-aminoethylimidazoline,
2-undecyl-1-aminoethylimidazoline,
2-n-heptyl-1-aminoethylimidazoline,
2-n-butyl-1-aminoethylimidazoline,
2-heptadecyl-1-diethylenediaminoimidazoline,
2-lauryl-1-triethylenetriaminoimidazoline,
2-lauryl-1-aminoethylimidazoline, homologs and isomers thereof. Mixtures of these reactants are within the purview of the invention. For instance, a mixture of 2-heptadecenyl and 2-heptadecadienyl-1-aminoethylimidazoline, prepared from tall oil fatty acids and diethylene triamine, is preferably used herein.

The foregoing reactants are well-known and can be prepared by methods disclosed in Reissue United States Patent 23,227. As already mentioned, the strongly alkaline imidazoline is preferably acidified initially to a pH between 7.5 and 11. However, for optimum results, a pH range between 8 and 10 is employed. Resultant acidified solution is next heated to temperatures between 60° C. and 90° C. while adding cyanamide thereto. As reaction occurs to form the respective guanidino-imidazoline, the pH of the reaction mass is held constant by the addition thereto of a mineral acid, such as hydrochloric acid. In general, however, a 50 percent molar excess of cyanamide solution is advantageously added to form the guanidino-imidazoline compounds of the present invention. In so proceeding, maximum yields of the desired compounds are obtained.

The guanidino-imidazoline compounds are next recovered as free bases by the addition of an alkaline compound, such as alkali metal hydroxide, and extracting the so-formed product in a hydrocarbon solvent, as for example, pentane or hexane. Upon evaporation of the solvent, desired product is obtained.

The invention will be further described and illustrated by the following specific examples which are to be taken as merely illustrative and not limitative of the invention. Unless otherwise stated, all parts are by weight.

EXAMPLE 1

To a suitable reaction vessel, equipped with condenser, stirrer and thermometer, are added 70 parts of 2-heptadecyl-1-aminoethylimidazoline (0.2 mol) dissolved in water. The solution is acidified with concentrated hydrochloric acid to a pH equal to 9. It is then heated with vigorous stirring to about 85° C. To this solution are then added 126 parts of a 10 percent aqueous solution of cyanamide (0.3 mol) over a period of approximately 15 minutes. The heating is continued for a total of four hours, and the solution is maintained at a pH of 9 by the periodic addition thereto of hydrochloric acid. Within the first two hours of reaction, a rapid increase in pH is observed. This corresponds to the rapid rate of guanidino-imidazoline formation. Gradually, the rate of guanidino-imidazoline formation decreases until the reaction is complete. It is found that a total of six parts of concentrated hydrochloric acid is added to maintain the desired pH during guanidino-imidazoline formation. Finally, the solution is cooled and acidified with additional concentrated hydrochloric acid to a pH of 6. Thereafter, the mixture is diluted with isopropanol and water to a total concentration of about ten percent.

On analysis, the desired compound as the free base has a molecular weight of 385 as compared to the theoretical value for 2-heptadecyl-1-guanidino-ethylimidazoline, which has a molecular weight of 393. The latter product demonstrates a very strong blue color with a nitroprusside-ferrocyanide-peroxide reagent. The blue coloration indicates the presence of the ethyl-guanidino group.

EXAMPLE 2

The procedure of Example 1 is repeated in every detail except that 53.4 parts of 2-undecyl-1-aminoethylimidazoline (0.2 mol) are reacted with 12.6 parts of cyanamide (0.3 mol) to obtain as a final product 2-undecyl-1-guanidinoethylimidazoline having a molecular weight of 302. The theoretical molecular weight calculated for the guanidino-imidazoline as prepared in this example is 309. The product gives a strong positive colorimetric test for N-alkylated guanidino-imidazoline.

EXAMPLE 3

Repeating the procedure of Example 1, 42 parts of 2-heptyl-1-aminoethylimidazoline are reacted with 12.6 parts of cyanamide, thereby obtaining as a final product 2-heptyl-1-guanidino-ethylimidazoline having a molecular weight of 245. The theoretical molecular weight for the latter compound is 253.

EXAMPLE 4

Following the procedure of Example 1, 78.8 parts of 2-heptadecyl-1-diethylenediaminoimidazoline are reacted with 12.6 parts of cyanamide to produce a final product, 2-heptadecyl - 1 - guanidino-diethyleneaminoimidazoline, having a molecular weight of 389. The calculated molecular weight for the latter product is 394.

EXAMPLE 5

The procedure of Example 1 is repeated except that mixed imidazolines prepared from a tall oil fatty acid and diethylene triamine are used. The unsaturated imidazolines are principally mixtures of 2-heptadecenyl-1-aminoethylimidazoline and 2 - heptadecadienyl-1-aminoethylimidazoline. 0.2 mol of the mixed imidazolines is reacted with 0.3 mol. of cyanamide to obtain a mixed guanidino-imidazoline product which gives a strong positive colorimetric test for N-alkylated guanidines. This product is waxy in feel, light-tan in color, and soluble in petroleum hydrocarbons.

EXAMPLE 6

In repeating the procedure of Example 1, 87 parts of 2-heptadecyl-1-triethylenetriaminoimidazoline are reacted with 12.6 parts of cyanamide, thereby obtaining as a final product 2-heptadecyl-1-guanidinotriethylenediaminoimidazoline, having a molecular weight of 466. The calculated molecular weight for the latter product is 479. The product gives a strong positive colorimetric test for N-alkylated guanidines and is waxy in feel, light tan in color and soluble in petroleum hydrocarbons.

EXAMPLE 7

The utility of the novel guanidinoimidazoline compounds can be readily demonstrated in the following example in which corrosion is reduced or minimized by simulating conditions similar to those found in an oil field. The tests employed all used prepared brines consisting of the following compounds:

(1) 90 parts of a brine mixture consisting of 10% sodium chloride and 0.5% calcium chloride, the remainder being water, and
(2) 10 parts of a mineral oil, and
(3) 1 part of a 6 percent acetic acid.

The foregoing solution is placed in a series of four ounce Pyrex glass jars which are then saturated with hydrogen sulfide just prior to the determination for corrosion. Into each jar is placed a known amount of the corrosion inhibitor. The concentration of inhibitors, as well as the results of the tests on each inhibitor, are tabulated below.

The corrosion detection system consists of a special soft steel probe which is sealed into a cap that fits each of the four ounce jars. The exposed probe and a second coated reference probe, which are connected in series, are made part of a bridge circuit. The ratio of resistance of the exposed specimen to that of the covered specimen is determined with a corrosometer before and after the test period. The latter instrument reports the increase in relative resistance of each test probe exposed to the test fluid for 24 hours at 120° F. under fixed conditions of agitation. The change in relative resistance of each can be correlated with corrosion in microinches. The percent protection afforded by each corrosion inhibitor is calculated as follows:

$$\frac{L_1 - L_2}{L_1} \times 100$$

wherein $L_1$ is defined as the corrosion in microinches of the probe in an uninhibited test fluid known as the control, and $L_2$ is defined as the corrosion in microinches of the probe in the inhibited test fluid. The results of the test are summarized as follows:

*Table I*

| Inhibitor | Percent Protection | |
|---|---|---|
| | 2.5 p.p.m. | 5.0 p.p.m. |
| (1) 2-heptadecyl-1-guanidino-ethylimidazoline | 90 | |
| (1a) 2-heptadecyl-1-amino-ethylimidazoline | 65 | |
| (2) 2-undecyl-1-guanidino-ethylimidazoline | 85 | |
| (2a) 2-undecyl-1-amino-ethylimidazoline | 0 | |
| (3) 2-heptyl-1-guanidino-ethylimidazoline | | 75 |
| (3a) 2-heptyl-1-amino-ethylimidazoline | | 0 |
| (4) 2-heptadecyl-1-guanidino-diethyleneaminoimidazoline | | 95 |
| (4a) 2-heptadecyl-1-diethylene-diaminoimidazoline | | 0 |
| (5) Mixture of 1:1 of 2-heptadecenyl and 2-heptadecadienyl-1-guanidinoethylimidazoline | | 75 |
| (5a) Mixture of 1:1 of 2-heptadecenyl and 2-heptadecadienyl-aminoethylimidazoline | | 0 |
| (6) 2-heptadecyl-1-guanidino-triethylenediamino-imidazoline | | 50 |
| (6a) 2-heptadecyl-1-triethylene-triaminoimidazoline | | 0 |

From the above table, it can be readily ascertained that the compounds of the present invention, as represented by compounds 1 through 6, provide substantial protection against corrosion fluids normally present and flowing through wall tubing and associated equipment generally employed in oil exploration. It will be noted that these compounds are effective corrosion inhibitors at concentrations which are far lower than the concentrations required for corrosion inhibitors of the prior art, as represented by compounds 1a through 6a, to provide equivalent protection.

Bacteriostatic tests utilizing the compounds of the invention have shown that these compounds have a marked effect on sulfate-reducing bacteria that are frequently present in oil production waters. The test employed is that procedure which is recommended by the American Petroleum Institute (Recommended Procedure No. 38). It is found, for example, that the compound of Example 1 (2 - heptadecyl-1-guanidinoethylimidazoline) requires 12 parts per million for excellent bacteriostatic control.

It is an important advantage of the present invention that the protective action of the guanidino-imidazoline compounds can be observed at extremely low concentrations. Such concentrations are in the order of 2.5 parts per million to 5.0 parts per million, and such quantities are hereinafter referred to as corrosion-inhibiting quantities. Of course, larger quantities than these may be used, but they do not appear to enhance the desired corrosion-inhibiting effects.

The present application constitutes a division of applicants' copending application, Serial No. 72,587, filed on November 30, 1960, now United States Letters Patent No. 3,093,654, issued on June 11, 1963.

We claim:

1. A method for protecting ferrous metal equipment exposed to corrosion of oil well fluid which comprises the steps of: adding to said oil well fluid a corrosion-inhibiting quantity from about 2.5 parts per million to about 5 parts per million of an imidazoline selected from the group consisting of a guanidino-imidazoline compounds and mixtures thereof, said compound being represented by the formula:

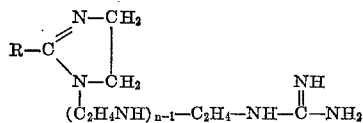

where $n$ is an integer from 1 to 4 and R is hydrocarbon of from 4 to 22 carbon atoms selected from the group consisting of alkyl, alkenyl and alkadienyl; and passing said oil well fluids through the said ferrous metal equipment so as to substantially minimize corrosion of said equipment.

2. A method according to claim 1, in which the guanidino-imidazoline compound is: 2-heptadecyl-1-guanidinoethylimidazoline.

3. A method according to claim 1, in which the guanidino-imidazoline compound is: 2-undecyl-1-guanidinoethylimidazoline.

4. A method according to claim 1, in which the guanidino-imidazoline compound is: 2-heptyl-1-guanidinoethylimidazoline.

5. A method according to claim 1, in which the guanidino-imidazoline compound is: 2-heptadecyl-1-guanidinodiethyleneaminoimidazoline.

6. A method according to claim 1, in which the mixture of guanidino-imidazoline compounds comprises: 2-heptadecenyl - 1 - guanidinoethylaminoimidazoline and 2-heptadecadienyl-1-guanidinoethylaminoimidazoline.

References Cited by the Examiner
UNITED STATES PATENTS

| | | | |
|---|---|---|---|
| 2,468,163 | 4/49 | Blair et al. | 252—8.55 |
| 2,700,652 | 1/55 | Menaul | 252—8.55 |
| 2,881,139 | 4/59 | Gysling | 252—390 |
| 2,889,334 | 6/59 | Hughes | 252—8.55 |
| 2,927,922 | 3/60 | Hughes | 252—8.55 |
| 2,987,522 | 6/61 | Shen | 252—8.55 |
| 3,008,898 | 11/61 | Hughes | 252—8.55 |
| 3,093,654 | 6/63 | Scanley et al. | 252—8.55 |

JULIUS GREENWALD, *Primary Examiner.*